United States Patent

[11] 3,585,402

[72] Inventors Dudley D. Nye, Jr.
Fort Lauderdale;
Thomas Pantelakis, Margate; Donald J. Wilson, Fort Lauderdale, all of, Fla.
[21] Appl. No. 838,977
[22] Filed July 3, 1969
[45] Patented June 15, 1971
[73] Assignee Borg-Warner Corporation
Chicago, Ill.

[54] SCR FIRING CIRCUIT
11 Claims, 2 Drawing Figs.
[52] U.S. Cl. .................................................. 307/247,
307/252, 318/138, 318/345
[51] Int. Cl. ...................................................... H03k 17/00
[50] Field of Search .......................................... 307/247,
252, 70, 71, 72, 90; 318/138, 345

[56] References Cited
UNITED STATES PATENTS
3,264,626  8/1966  Mounce ........................ 307/252 X
3,426,969  2/1969  Anderson, Jr. ................ 307/247 X Primary Examiner—John S. Heyman
Assistant Examiner—John Zazworsky
Attorneys—Donald W. Banner, William S. McCurry and John W. Butcher ABSTRACT: An SCR firing circuit is provided for each SCR in a multiphase power circuit supplying a DC motor. Each firing circuit includes an output transistor, controlled in the on-off mode by a multivibrator circuit, for providing continuous gate drive to its associated SCR when the multivibrator switching circuit turns it on. A charging circuit includes a capacitor and a transistor connected so that a control signal applied to the transistor determines the rate of capacitor charge. When a predetermined voltage is applied across the capacitor, a unijunction transistor fires and applies a trigger signal to the multivibrator switching circuit for applying a continuous gate drive to the SCR. A signal from the input AC line which supplies the power circuit is utilized to reset the multivibrator switching circuit and remove the gate drive at the proper time.

Inventors
Dudley D. Nye, Jr.
Thomas Pantelakis
Donald J. Wilson
By James J. Jennings, Jr.
Attorney

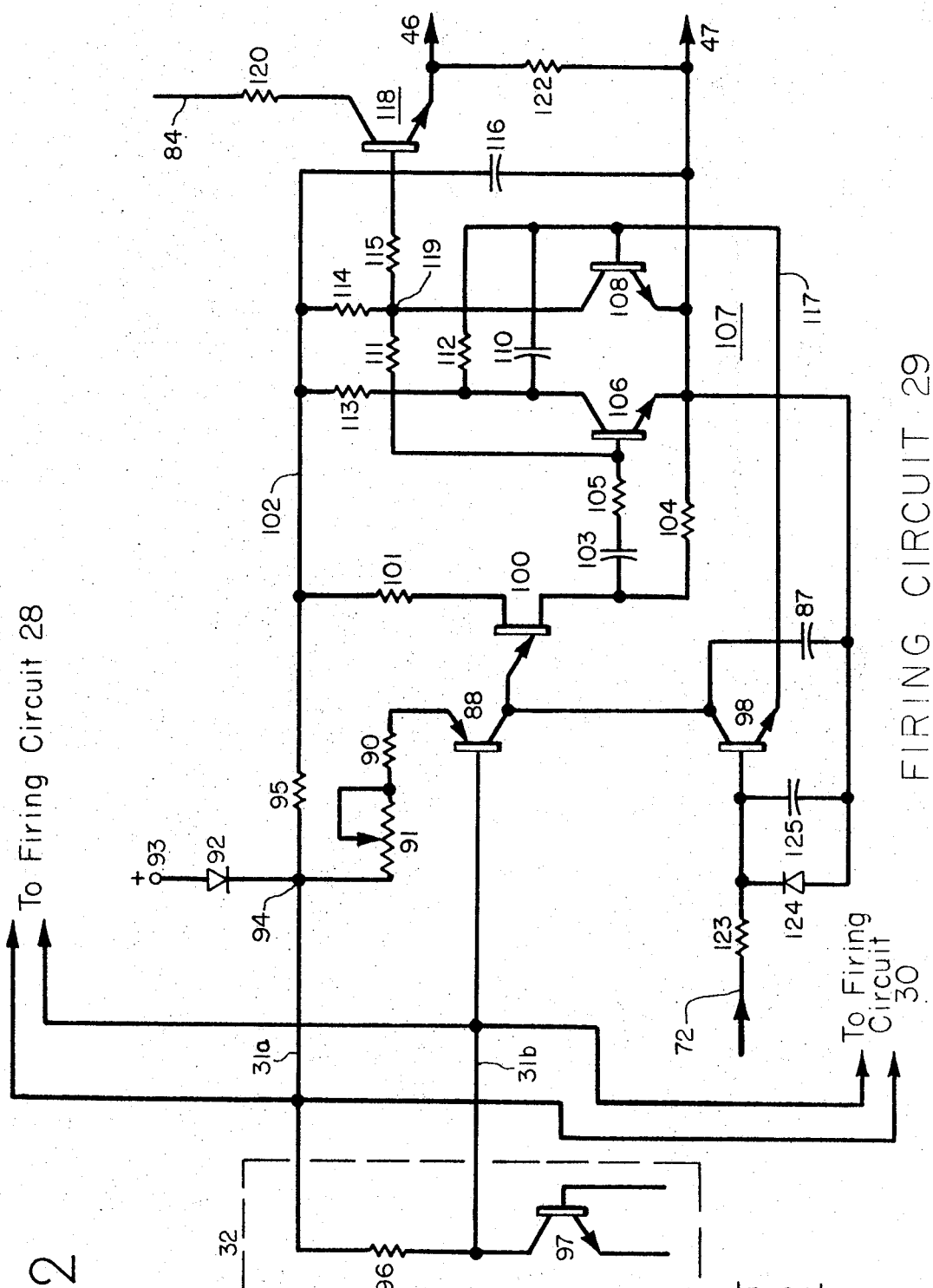

SCR FIRING CIRCUIT

BACKGROUND OF THE INVENTION

Various arrangements for regulating conduction and nonconduction of semiconductor power switches, such as silicon controlled rectifiers (SCR's), have been provided to regulate the amount of electrical power transferred to an electrical motor. In this way the motor speed can be determined by a control circuit or firing circuit which regulates the on and off times of the SCR's. When a conventional single-phase or three-phase power main supplies the circuit in which an SCR is connected, a sudden power outage or "notch" in the input voltage waveform can cause a particular SCR to be switched off before the proper time dictated by the firing circuit. The inadvertently turned off SCR will then remain off until it is again switched on by the firing circuit in the next cycle of operation.

One of the reasons this accidental turnoff occurs is that a "snubber" circuit is frequently coupled across the armature circuit of the motor to minimize effects of the transient voltages that appear across the armature when the SCR's are first turned on. The snubber circuit conventionally includes a capacitor series-coupled with a resistor having a relatively low ohmic value. Thus as the armature voltage builds up, if there is a sudden notch or reduction in the amplitude of the supply voltage, the voltage then appearing across the capacitor in the snubber circuit can back bias the conducting SCR so as to commutate it off before its appointed turnoff time. However if a continuous gate drive signal were applied to the SCR its conduction would be restored as soon as the notch or voltage decrease was past. The general practice in this art has been to apply the SCR gating pulse over a pulse transformer, and thus the gate drive is only maintained for a brief period to insure that the SCR is turned on at the proper time.

It is therefore a primary consideration of the invention to provide an SCR firing circuit which applies a continuous gate drive pulse to the SCR which should be conductive, and maintains this continuous gate drive signal over the entire time period during which the SCR should be maintained conductive.

Another consideration of this invention is to provide an optional interconnection between the three firing circuits for a three-phase, three SCR, three diode, rectifier bridge, to insure a continuous firing pulse which is inhibited during commutation if the SCR anode goes negative before the power line synchronizing or reset signal is received.

SUMMARY OF THE INVENTION

This invention includes a firing circuit for an SCR which has an anode, a cathode, and a gate. The firing circuit comprises a semiconductor output switch connected to provide a continuous gate drive signal to the SCR gate when the semiconductor output switch is conducting. A switching circuit is connected to enable and disable the semiconductor output switch, to provide and remove the continuous gate drive signal. A charging circuit includes a capacitor and a variable semiconductor switch, connected such that the capacitor is charged at a rate which is a function of the conduction level of the variable semiconductor switch. Means is connected to operate, in response to a predetermined voltage appearing across the capacitor, to apply a trigger signal to the switching circuit and thus provide the continuous gate drive signal. A reset means is connected to effect rapid discharge of the capacitor, and to disable the semiconductor output switch for removing the gate drive signal.

THE DRAWINGS

In the several figures of the drawings like reference numerals identify like elements, and in the drawings:

FIG. 1 is a schematic diagram, partly in block form, depicting the present invention incorporated in a motor energizing system; and FIG. 2 is a schematic diagram of a firing circuit shown generally in FIG. 1.

DETAILED DESCRIPTION OF THE INVENTION

Figure 1:
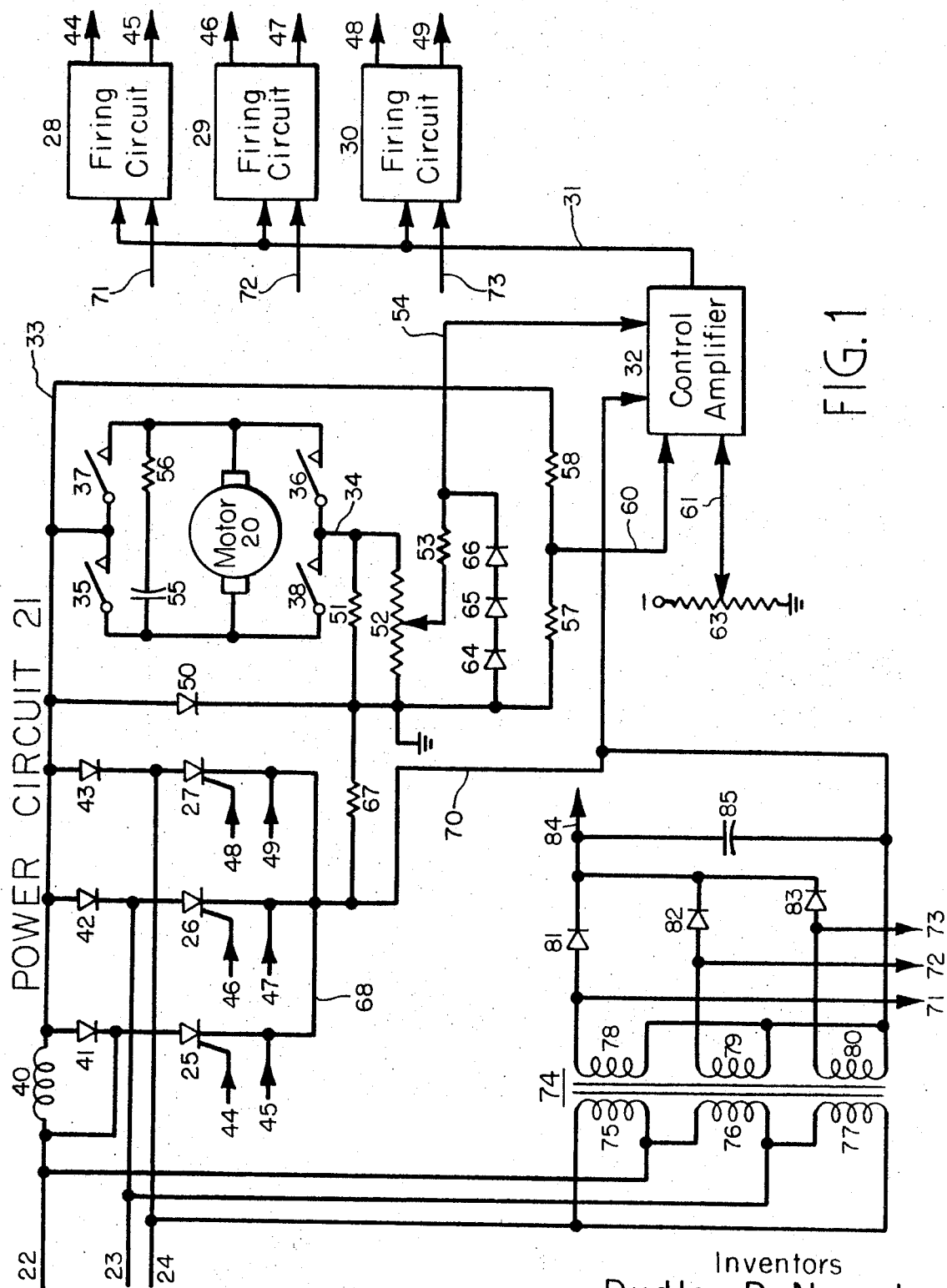

FIG. 1 depicts a motor-energizing system in which the armature circuit of a motor 20 receives energy from a power circuit 21 which, in turn, is supplied with three-phase AC energy over three input conductors 22, 23 and 24. The level of energy passed to the motor is determined by the conduction times of semiconductor power switches or silicon controlled rectifiers (SCR's) 25, 26 and 27 which, in turn, are regulated by gating signals provided by firing circuits 28, 29 and 30. The firing circuits are controlled by an output signal received over circuit 31 from a control amplifier 32, which operates in response to different input signals, and are also controlled by synchronized reset signals received over conductors 71—73 and transformer 74.

Motor 20 is energized as DC energy is passed through power circuit 21 and applied between conductors 33 and 34. When switches 35 and 36 are closed, current flows through motor 20 in a first direction and effects motor rotation in a given angular direction. When switches 35, 36 are opened and switches 37, 38 are closed (by control components not illustrated because they are well known), current flows through motor 20 in the opposite direction and effects motor rotation in the opposite angular direction. A snubber circuit, including a capacitor 55 coupled in series with a resistor 56, is coupled in parallel with the armature of motor 20 to minimize the effects of transients when the SCR's are first turned on.

Motor field winding 40 is coupled between conductors 22 and 33. Three diodes 41, 42 and 43 are respectively coupled in series with the semiconductor switches 25, 26 and 27. The input conductors 22—24 are respectively connected to the common connections between each diode-SCR pair. Although the semiconductor power switches 25—27 are illustrated as silicon controlled rectifiers, other components such as thyratrons, ignitrons, power transistors, transistors, electron-discharge devices and similar switching units can be used in their place. In another method, only one semiconductor power switch is required to regulate the level of motor energization. Such switch can be coupled in a series circuit connection, in a "chopper" or DC-to-DC converter arrangement, in lieu of the illustrated three-phase rectifier arrangement. Silicon controlled rectifier 25 receives gating or turn-on signals over conductors 44, 45 from firing circuit 28; SCR 26 receives gating signals over conductors 46 and 47 from firing circuit 29; and SCR 27 receives turn-on signals over conductors 48, 49 from firing circuit 30.

A "freewheeling" diode 50 is coupled between conductor 33 and circuit common or ground. Because of the inductive reactance of the motor, the turnoff of a given silicon controlled rectifier may terminate current supply while the motor tends to keep current flowing; the freewheeling diode 50 maintains a path for the continuing current flow. A resistor 51 is coupled between conductor 34 and ground. A potentiometer 52 is coupled between conductor 34 and ground, and the movable arm is coupled over a resistor 53 and a conductor 54 to a control amplifier 32.

A pair of resistors 57, 58 are coupled in series between conductor 33 and ground, and conductor 60 is coupled between the midpoint of these two resistors and an input connection of control amplifier 32. The control amplifier also receives a speed reference signal over line 61 from a potentiometer 63. Three diodes 64, 65 and 66 are coupled in series between conductor 54 and ground to protect against an unduly large signal being passed over conductor 54 to the control amplifier stage if resistor 51 were to open, or if for some other reason an excess current were to be suddenly supplied over resistor 53. A resistor 67 is coupled between ground and a common conductor 68 which is coupled to the cathodes of all the semiconductor switches 25, 26 and 27. Conductor 70 is coupled to the common connection of resistor 67 and common conductor 68, and is also coupled to control amplifier stage 32.

Transformer 74 has three primary windings 75, 76 and 77 coupled to the input conductors 22, 23 and 24 over which three-phase AC energy is received from any conventional source. The three secondary windings 78, 79 and 80 of transformer 74 have their lower terminals coupled together, and to conductor 70. The upper end of each secondary winding is respectively connected to a diode 81, 82 and 83, the cathodes of which are coupled in common and to an output conductor 84. A filter capacitor 85 is coupled between output conductor 84 and common conductor 70. In addition to the respective diodes 81—83, a sync or reset conductor 71, 72 and 73 is also coupled to the upper end of each of the secondary windings 78—80.

All the firing circuits 28—30 are the same, and thus the illustration and description of a single circuit will suffice for an understanding of all three. In addition it is noted that the circuit and techniques of this invention are applicable to single phase systems, in which only a single firing circuit is utilized.

In firing circuit 29, depicted in FIG. 2, a charging circuit includes a capacitor 87 coupled in series with a variable semiconductor switch, shown as a PNP-type transistor 88. Also coupled in series in the same charging circuit are a resistor 90 and a potentiometer 91, but those skilled in the art will appreciate that a single resistive component can function in place of the two shown. A diode 92 is coupled between an energizing terminal 93 and the common connection 94 to which conductor 31a, potentiometer 91 and resistor 95 are all coupled. Thus terminal 93, or the conductor coupled to terminal 94, represents means for energizing the charging circuit such that capacitor 87 is charged at a rate which is a function of the conduction level of variable semiconductor switch 88.

Conductor 31b is coupled to the base of transistor 88, and the emitter of transistor 88 is coupled, through resistor 90 and the effective portion of potentiometer 91, to conductor 31a. In the illustrated portion of control amplifier stage 32, a resistor 96 is coupled between conductors 31a and 31b. This resistor is also coupled in series with the collector-emitter path of a transistor 97, so that the conduction level of this transistor, itself a function of different variables combined in the control amplifier stage, determines the voltage drop across resistor 96 and the conduction level of transistor 88.

The collector of transistor 88 is coupled to the upper plate of capacitor 87, to the collector of an NPN-type transistor 98, and to the emitter of a unijunction transistor 100. The base two connection of this unijunction transistor is coupled through a resistor 101 to conductor 102, and the base one connection is coupled to one side of a capacitor 103 and to one side of a resistor 104. Another resistor 105 is coupled in series between capacitor 103 and the base of a first transistor 106 in a multivibrator or flip-flop circuit 107. It will become apparent that unijunction transistor 100 represents a voltage-responsive component connected to operate when a predetermined voltage appears across capacitor 87, to apply a trigger signal through capacitor 103 and resistor 105 to the base of transistor 106 and turn this transistor on. In accordance with well-known multivibrator circuit operation, this action rapidly drives the other NPN-type transistor 108 off.

The emitters of transistors 106, 108 are coupled to the common output conductor 47. The collector of transistor 106 is coupled through capacitor 110 to the base of transistor 108, and the collector of transistor 108 is coupled through a resistor 111 to the base of transistor 106. A resistor 112 is coupled in parallel with capacitor 110. A resistor 113 is coupled between conductor 102 and the collector of transistor 106. Resistor 114 is coupled between conductor 102 and the common connection 119 between resistor 111, resistor 115 and the collector of transistor 108. A capacitor 116 is coupled between conductors 102 and 47. Circuit 107 is thus seen to be a switching circuit or a multivibrator-type circuit having first and second semiconductor switches 106, 108 connected to operate in a flip-flop manner. Transistor 106 is gated on when a signal is received at its base, and transistor 108 is driven on when it receives a signal over conductor 117 from the emitter of transistor 98. Resistor 115 is coupled between connection 119 and the base of a semiconductor output switch 118, the collector of which is coupled through a resistor 120 to energizing conductor 84. This output switch, shown as another NPN-type transistor, has its emitter coupled to output conductor 46. A resistor 122 is coupled between output conductors 46, 47.

Transistors 98 is connected to function as a reset semiconductor switch, with its emitter coupled to conductor 117 and its collector coupled to the common connection between capacitor 87, the collector of transistor 88 and the emitter of unijunction transistor 100. The base of transistor 98 is coupled through a resistor 123 to conductor 72 over which a reset signal is received from secondary winding 79 of transformer 74. A diode 124 and a capacitor 125 are coupled in parallel, and this protective circuit is coupled between the base of transistor 98 and the common output conductor 47.

In operation it is initially assumed that the second or reset transistor 108 in the switching circuit 107 is conductive, with transistor 106 off. Conduction of transistor 108 maintains a sufficiently low voltage at the base of semiconductor output switch 118 so that this transistor is off, and there is no gate drive supplied to SCR 26. It is additionally assumed that capacitor 87 is just beginning to charge and has not accumulated a voltage sufficient to fire unijunction transistor 100. Reset semiconductor switch 98 is off, and variable transistor 88 is conducting at a level determined by the signal between conductors 31a and 31b.

Capacitor 87 charges, at a rate determined by the conduction level of transistor 88, over a circuit extending from terminal 93 and including diode 92, terminal 94, the effective portion of potentiometer 91, resistor 90, the emitter-collector path of transistor 88, and capacitor 87 to conductor 47. When capacitor 87 accumulates a predetermined voltage, unijunction transistor 100 fires and produces a pulse or trigger signal across resistor 104 which is coupled through capacitor 103 and resistor 105 to the base of the first transistor 106 in switching circuit 107.

As transistor 106 is rapidly driven on, the voltage at its collector goes negative toward the potential on conductor 47. This action produces a negative-going pulse which is applied through capacitor 110 to the base of second transistor 108, rapidly switching this transistor off. As transistor 108 becomes nonconductive, the voltage at the common connection 119 rapidly goes positive to hold transistor 106 on via resistor 111 and to drive the semiconductor output switch 118 into conduction. This action completes a path for current flow from conductor 84 over resistor 120, the collector-emitter path of switch 118, and resistor 122 to conductor 47. Accordingly with this arrangement, semiconductor output switch 118 remains conducting and a continuous gate drive signal is maintained between conductors 46, 47 for application between the gate and cathode of SCR 26.

When the polarity of the voltage across secondary winding 79 of transformer 74 reverses, a reset or positive-going turn-on signal is applied over conductor 72 and resistor 123 to the base of transistor 98, rapidly driving this transistor on. Thus transistor 98 conducts and completes a path for the discharge of capacitor 87 which includes the base-emitter path of second transistor 108 in switching circuit 107. That is, the voltage at the upper plate of capacitor 87 is positive with respect to that of its lower plate, coupled to conductor 47. Discharge current flows from the upper plate of capacitor 87 over a path including the collector-emitter path of reset semiconductor switch 98, conductor 117, and the base-emitter path of transistor 108 to conductor 47. Accordingly capacitor 87 is very rapidly discharged and transistor 108 is driven on. The voltage at common connection 119 rapidly reduces to almost zero, and this clamping of the voltage at connection 119 to the level of the voltage on conductor 47 turns off transistor 106 and transistor 118. Thus the original circuit conditions are reestablished and capacitor 87 again commences to charge through transistor 88 at a rate determined by the output signal from control amplifier output stage 32.

Adjustment of potentiometer 91 provides a means for equalizing the charging rates in all the firing circuits, considering that the actual components in each circuit unit do not have precisely the same values as those in the other circuits. The circuit in its reset operation can be modified by coupling the emitter of reset transistor 98 directly to the common point between capacitors 125 to 87, to effect a more readily apparent discharge of the capacitor 87. By connecting a resistor from the base of transistor 108 to the common connection 119 in firing circuit 30, appropriate synchronization of the turn off in still maintained with the different connection of reset switch 98. In this case it is also necessary to similarly interconnect firing circuit 29 to control firing circuit 28, and firing circuit 28 to control firing circuit 30. This interconnection between the firing circuits 28—30 causes the firing pulses on the SCR's to be inhibited when the next SCR turns on, and prevents application of a positive gate signal to an SCR which then has a negative-going voltage applied to its anode. This reduces power dissipation in the SCR's.

Solely to assist those skilled in the art to make and use the invention with a minimum of experimentation, a table of typical circuit components and identifications or values is set out below. This table is given by way of illustration only and in no sense by way of limitation. To energize the components, a +16 volts potential, relative to the potential on reference conductor 47, was applied to terminal 93. Rectifier circuit 81—83 supplied a +15 volts potential over conductor 84 to the top of resistor 120.

| | |
|---|---|
| 88 | 2N3638A |
| 100 | 2N2646 |
| 106,108 | 2N2714 |
| 118 | 2N3417 (selected) |
| 92,124 | 1N5059 |
| | |
| 87 | 0.22 mfd., ±10%, 250 vdc |
| 103 | 500 pfd., ±10%, 500 vdc |
| 110 | 100 pfd., ±10%, 500 vdc |
| 116 | 0.10 mfd., ±10%, 250 vdc |
| 125 | 0.01 mfd., ±10%, 250 vdc |
| | |
| 90 | 825 ohms, ±1% |
| 91 | 750 ohms, ±10% |
| 95,104,122 | 100 ohms, ±10% |
| 101 | 470 ohms, ±5% |
| 105 | 10 K ohms, ±10% |
| 111,112 | 27 K ohms, ±10% |
| 113,114 | 1.8 K ohms, ±5% |
| 115 | 3.9 K ohms, ±5% |
| 120 | 50 ohms, ±1% |
| 123 | 22 K ohms, ±10% |

While only a particular embodiment of the invention has been shown and described, it will be apparent to those skilled in the art that various changes and modifications may be made therein without departing from the invention in its broader aspects. Therefore the aim in the appended claims is to cover all such charges and modifications as may fall within the true spirit and scope of the invention.

What I claim is:

1. A firing circuit for an SCR having an anode, a cathode, and a gate, comprising:
   a semiconductor output switch connected to provide a continuous gate drive signal to the SCR gate when said semiconductor output switch is conducting,
   a switching circuit connected to enable and disable the semiconductor output switch to provide and remove the continuous gate drive signal,
   a charging circuit, including a capacitor and a variable semiconductor switch, connected such that the capacitor is charged at a rate which is a function of the conduction level of the variable semiconductor switch,
   means connected to operate in response to a predetermined voltage appearing across the capacitor to apply a trigger signal to the switching circuit and thus provide the continuous gate drive signal, and
   reset means connected to effect rapid discharge of the capacitor, and to disable the semiconductor output switch and remove the gate drive signal.

2. A firing circuit as claimed in claim 1 and in which said switching circuit comprises first and second semiconductor switches intercoupled in a multivibrator circuit, operative to change the state of the semiconductor output switch from nonconducting to conducting each time the trigger signal is supplied to the switching circuit.

3. A firing circuit as claimed in claim 1 in which said charging circuit includes a potentiometer, adjustable to compensate for variations in the components of the firing circuit.

4. A firing circuit as claimed in claim 1 in which the means which operates in response to appearance of the predetermined voltage across the capacitor is a unijunction transistor, and circuit means is coupled between the unijunction transistor and the switching circuit for passing the trigger signal to actuate the switching circuit each time the unijunction transistor is fired.

5. A firing circuit for an SCR having an anode, a cathode, and a gate, comprising:
   a semiconductor output switch connected to provide a continuous gate drive signal to the SCR gate when said semiconductor output switch is conducting,
   a switching circuit having first and second semiconductor switches, connected such that conduction of the second semiconductor switch disables the semiconductor output switch and removes the gate drive signal, and conduction of the first semiconductor switch turns off the second semiconductor switch and turns on the semiconductor output switch to provide the continuous gate drive signal,
   a charging circuit, including a capacitor, a variable semiconductor switch, and a resistive component, all coupled in series with a conductor for energizing the charging circuit such that the capacitor is charged at a rate which is a function of the conduction level of the variable semiconductor switch,
   means, including a voltage-responsive component, coupled between the charging circuit and the switching circuit, for operating in response to a predetermined voltage appearing across the capacitor to apply a trigger signal for turning on the first semiconductor switch in the switching circuit and thus providing the continuous gate drive signal, and
   means, including a reset semiconductor switch, coupled between a conductor for receiving a reset signal and the capacitor in the charging circuit, for effecting rapid discharge of said capacitor and conduction of the second semiconductor switch in the switching circuit to disable the semiconductor output switch and remove the gate drive signal.

6. A firing circuit as claimed in claim 5 and in which said semiconductor output switch is a transistor coupled between a plane of energizing potential and a plane of reference potential, and a component is coupled between the transistor and the reference potential plane to provide the continuous gate drive signal whenever the transistor is gated on by a signal from the switching circuit.

7. A firing circuit as claimed in claim 5 and in which the resistive component in the charging circuit is adjustable, to effect compensation for manufacturing variations in the circuit components.

8. A firing circuit as claimed in claim 5 in which said voltage-responsive component is a unijunction transistor, having an emitter, base one and base two connections, means for coupling the unijunction transistor emitter to a point in said charging circuit to fire the unijunction transistor when the voltage accumulated across the capacitor reaches a predetermined value, and means operative responsive to firing of the unijunction transistor to couple a firing pulse to the first semiconductor switch in the switching circuit.

9. In a system for energizing a DC motor from an input circuit having three conductors over which three-phase AC energy is received, a power circuit having at least three SCR's, each with anode, cathode and gate connections for selective control of SCR conduction time by application of an appropriate anode-cathode potential and a gate drive signal, a control amplifier stage connected to sense motor terminal voltage and motor armature current and to provide an output signal indicating the desired conduction time of the SCR's, and three separate firing circuits for the respective SCR's, each firing circuit having an input circuit connected to receive the output signal from the control amplifier stage and having an additional input circuit for receiving a reset signal, each firing circuit comprising:

an output transistor coupled between a conductor for receiving energy and an output resistor, such that conduction of the output transistor develops a gate drive signal across said resistor for application between the gate and cathode of the SCR associated with the firing circuit, a multivibrator switching circuit having first and second transistors intercoupled in a flip-flop circuit, such that turn-on of the first transistor is effective both to turn off the second transistor and to gate on the output transistor, and turn-on of the second transistor is effective both to turn off the first transistor and to disable the output transistor to remove the gate drive signal, a charging circuit, including a capacitor, the collector-emitter path of a control transistor, and at least one resistive component, all coupled in series for receiving an energizing potential such that the rate of charge of the capacitor is a function of the conduction level of the control transistor, circuit means, including a unijunction transistor, coupled between the charging circuit and the multivibrator switching circuit, operative in response to accumulation of a predetermined voltage level across the capacitor to fire the unijunction transistor and pass a pulse signal to the multivibrator circuit to gate on the first transistor and switch off the second transistor, thus turning on the output transistor to supply continuous gate drive to the associated SCR, and a reset circuit, including a reset transistor coupled to said capacitor and to said second transistor in the multivibrator switching circuit, operative responsive to receipt of a reset signal to render the reset transistor conductive to both discharge the capacitor and gate on the second transistor in the multivibrator circuit, returning the multivibrator switching circuit to its original state and removing the continuous gate drive signal from the associated SCR.

10. A motor-energizing system as claimed in claim 9 and further comprising a three-phase transformer having three primary windings and three secondary windings, means for coupling the primary windings to the three input conductors over which AC input energy is received, and at least three separate conductors coupled between said secondary windings and the respective reset transistor of each firing circuit, to synchronize turnoff of the continuous gate drive with the appropriate polarity reversals of the received AC energy.

11. A motor-energizing system as claimed in claim 10 and further comprising a rectifier circuit, coupled between said secondary windings and the transistor output switch, for supplying the energy to the output transistor of each firing circuit for providing the continuous gate drive signal as the output transistor is gated on.